US008268281B2

(12) United States Patent
Harutyunyan et al.

(10) Patent No.: US 8,268,281 B2
(45) Date of Patent: Sep. 18, 2012

(54) DRY POWDER INJECTOR FOR INDUSTRIAL PRODUCTION OF CARBON SINGLE WALLED NANOTUBES (SWNTS)

(75) Inventors: Avetik Harutyunyan, Columbus, OH (US); Toshio Tokune, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 845 days.

(21) Appl. No.: 11/433,161

(22) Filed: May 12, 2006

(65) Prior Publication Data

US 2007/0264187 A1 Nov. 15, 2007

(51) Int. Cl.
*D01C 5/00* (2006.01)

(52) U.S. Cl. .................................... 423/447.3; 977/843

(58) Field of Classification Search ............... 423/447.3, 423/447.1, 447.2, 445 B; 977/842–848
See application file for complete search history.

(56) References Cited

U.S. PATENT DOCUMENTS 3,776,150 A * 12/1973 Evans et al. .................. 110/245
5,037,791 A * 8/1991 Comolli et al. ............... 502/185
6,413,487 B1 * 7/2002 Resasco et al. ............ 423/447.3
6,730,284 B2 5/2004 Harutyunyan et al.
6,905,544 B2 6/2005 Setoguchi et al.
6,919,064 B2 * 7/2005 Resasco et al. ............ 423/447.3
6,955,800 B2 10/2005 Resasco et al.
2004/0151654 A1 8/2004 Wei et al.
2005/0074392 A1 4/2005 Yang et al.
2005/0121545 A1 6/2005 Harutyunyan et al.
2005/0123467 A1 * 6/2005 Harutyunyan ............ 423/447.1
2006/0039849 A1 2/2006 Resasco et al.

OTHER PUBLICATIONS

Dai, et al., Single-wall nanotubes produced by metal-catalyzed disproportionation of carbon monoxide, Chemical Physics Letters 1996; 260: 471-475.*
Harutyunyan, et al., A New Approach for Industrial-Scale Production of Carbon Single-Walled Nanotubes, Mater. Res. Soc. Symp. Proc. vol. 896, pp. 0896-H05-05.1 to 0896-H05-05.5, Feb. 24, 2006.*
Sinclair, et al., Gas-Particle Flow in a vertical Pipe with Particle-Particle Interactions, AIChE Journal 1989; 35(9): 1473-1486.*
PCT International Search Report and Written Opinion, PCT/US2007/068681, Apr. 25, 2008.

* cited by examiner

*Primary Examiner* — Daniel C. McCracken
(74) *Attorney, Agent, or Firm* — Fenwick & West LLP; Mark Duell

(57) ABSTRACT

Methods, processes, and apparatuses for the continuous synthesis of carbon nanostructures are provided. Metal catalysts having small diameter and narrow distribution of particle sizes are prepared and continuously injected as aerosols into a reactor. The metal catalysts are supported on supports that are substantially free of carbon. The metal catalyst, in the form of a powder, is placed on a fluidized bed and aerosolized using an inert gas. The powder entrained in the gas is injected near the top of a vertical reactor for the synthesis of SWNTs.

9 Claims, 1 Drawing Sheet

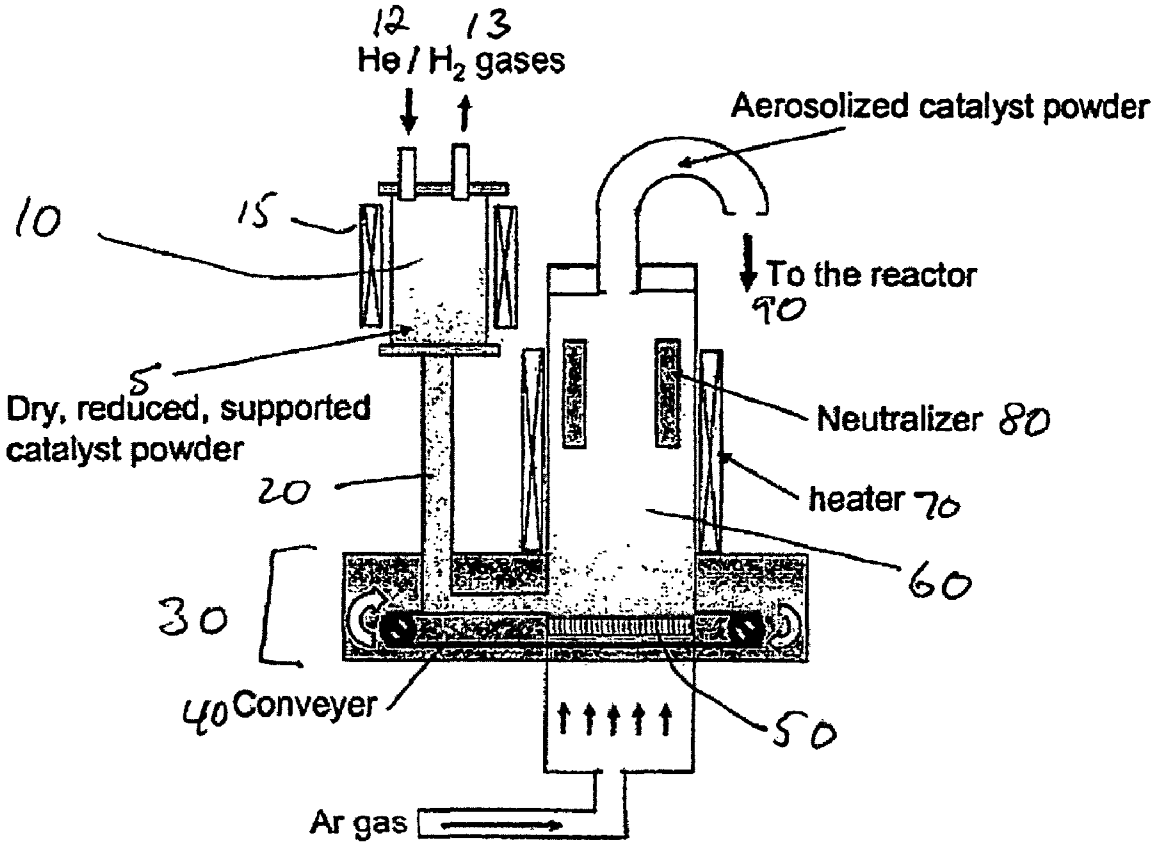
12
13
He / $H_2$ gases
Aerosolized catalyst powder
10
15
To the reactor
90
5
Dry, reduced, supported catalyst powder
Neutralizer 80
20
heater 70
60
30
40 Conveyer
50
Ar gas

DRY POWDER INJECTOR FOR INDUSTRIAL PRODUCTION OF CARBON SINGLE WALLED NANOTUBES (SWNTS)

FIELD OF INVENTION

The present invention relates to producing carbon nanotubes, and more particularly, to methods and apparatus for the continuous production of carbon single-walled nanotubes on an industrial scale.

BACKGROUND

Carbon nanotubes are seamless tubes of graphite sheets with full fullerene caps. Carbon nanotubes are made in the presence of transition metal catalysts, and were first discovered as multilayer concentric tubes, usually referred to as carbon multi-walled nanotubes, and subsequently as carbon single-walled nanotubes (SWNTs). Carbon nanotubes are useful for a wide range of applications including nanoscale electronic devices, high strength materials, electron field emission, tips for scanning probe microscopy, and gas storage. Generally, SWNTs are preferred over multi-walled carbon nanotubes for use in these applications. However, the availability of SWNTs in large enough quantities necessary is still problematic, and methods for their large scale production are still needed.

A typical method for the synthesis of SWNTs is described in U.S. Pat. No. 6,955,800 to The Board of Regents of University of Oklahoma where supported catalytic particles are reduced in a fluidized bed and carbon nanotubes are catalytically formed by exposing the reduced catalytic particles to a carbon-containing gas in the fluidized bed. The reacted catalytic particles are cooled and the catalytic material is separated from the carbon nanotubes. The synthesis of SWNTs is inefficient since the reported yield is about 1 g/h.

U.S. Pat. No. 6,905,544 describes a method for continuously manufacturing carbon nanotubes. A catalyst having a specific gravity and particle diameter is placed on a fluidized bed and maintained within a predetermined temperature and pressure range to form the carbon nanotubes. Thus, the fluidized bed containing the catalytic particles acts as the reactor for the synthesis of carbon nanotubes.

Another method, described in U.S. Publication No. 2005/0074392 grows single-wall carbon nanotubes using iron and molybdenum catalysts supported on magnesium oxide support material. The supported catalyst is contacted with a carbon-containing gas to make single-wall carbon nanotubes. The process can be conducted in batch, continuous or semi-continuous modes, in reactors, such as a transport reactor, fluidized bed reactor, moving bed reactors and combinations thereof.

U.S. Publication No. 2004/0151654 to Tsinghua University, China describes a method for the continuous manufacture of carbon nanotubes using a nano-agglomerate fluidized-bed and reactor. The publication describes a method where a transition metal oxide on a support is activated by flowing a mixture of nitrogen and hydrogen or carbon monoxide into the reactor to reduce the nanosized transition metal oxide particles to nanosized metal particles and the catalyst is in the form of nano-agglomerates. The nano-agglomerate catalyst is transported into a fluidized-bed reactor and reacted with a gas of lower hydrocarbons having less than 7 carbon atoms to form carbon nanotubes.

The currently available methods for the continuous synthesis of SWNTs have production rates of less than 1 g/h. A major shortcoming of the current continuous large scale production is the injection of catalyst particles into the reactor. Thus, there is a need for methods for the continuous production of high quality SWNTs on an industrial scale.

SUMMARY

The present invention provides methods, apparatuses, and processes for the large scale continuous production of carbon nanostructures, such as carbon single-walled nanotubes (SWNTs). In one aspect, a modified fluidized bed is used as an injector for the supported catalyst used for the continuous large scale production of carbon SWNTs. The advantages of a fluidized bed injector are that it provides an injection of aerosolized, deagglomerated catalyst as a dry powder that can be delivered into a reactor at a constant rate of flow.

In one aspect of the invention, metal particles having controlled particle size and/or diameter can be supported on non-carbon containing powdered oxide supports and placed in a chamber. The supported catalyst can be reduced and transferred to a fluidized bed. The reduced catalyst on the fluidized bed can be aerosolized using an inert gas, optionally heated to remove moisture and/or to bring the temperature of the catalyst to near reaction temperature, and the aerosolized catalyst powder can be injected into the top portion of a reactor where the metal nanoparticles can be used as growth catalyst for the growth of carbon nanotubes. Thus, the fluidized bed is used as an injector where supported metal nanoparticles can be entrained in a gas and delivered into the reaction chamber as an aerosol.

In one aspect, the invention provides an apparatus for injecting dry powder. The apparatus comprises a first container, a fluidized bed connected to the first container and having means for creating an aerosol of the dry powder, and a second container connected to the fluidized bed and connected to top portion of a vertical reactor. The dry powder is preferably a catalyst for preparing SWNTs, and the dry powder can be reduced using $H_2$, $NH_3$, $CH_4$, He, Ar, Kr, Xe, or $N_2$ or mixtures thereof. The dry powder or catalyst can be a metal catalyst supported on a powdered oxide substrate wherein the powdered oxide substrate has a particle size of 0.5 μm to 5 μm, and the aerosol is created using pressurized helium or argon. In some aspects, the aerosolized powder can be heated to about 600° C. to about 1200° C.

In another aspect of the invention, the invention provides methods for producing carbon single-walled carbon nanotubes (SWNTs). The methods comprise injecting an aerosol of heated, dry, and reduced catalytic particles into a reactor wherein the catalytic particles comprise a support-material and a catalytic material, and wherein the aerosol is created using a fluidized bed, and catalytically forming SWNTs by exposing the reduced catalytic particles to a carbon-containing gas for a duration of time and at a temperature sufficient to cause catalytic production of SWNTs. The catalytic particles can be cobalt, iron, nickel, tungsten, molybdenum or combinations thereof, the support material can be $SiO_2$, $Al_2O_3$, MgO, $ZrO_2$, zeolites, MCM-41, or Mg(Al)O, or combinations thereof, and the carbon-containing gas can be a gas selected from the group consisting of CO, $CH_4$, $C_2H_4$, and $C_2H_2$, or mixtures thereof. The catalyst can be reduced using $H_2$, $NH_3$, $CH_4$, He, Ar, Kr, Xe, or $N_2$ or mixtures thereof. The supported catalyst can have a particle size of 0.5 μm to 5 μm, and the aerosol is created using pressurized helium or argon. In some aspects, the aerosolized catalyst can be heated to about 600° C. to about 1200° C.

These and other aspects of the present invention will become evident upon reference to the following detailed description. In addition, various references are set forth herein which describe in more detail certain procedures or compositions, and are therefore incorporated by reference in their entirety.

BRIEF DESCRIPTION OF DRAWINGS

FIG. 1 illustrates the injector of the present invention.

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry 3$^{rd}$ Ed." Vols. A and B, Plenum Press, New York, and Cotton et al. (1999) "Advanced Inorganic Chemistry 6$^{th}$ Ed." Wiley, New York.

The terms "metalorganic" or "organometallic" are used interchangeably and refer to co-ordination compounds of organic compounds and a metal, a transition metal or metal halide.

The term "passivating solvent" as used herein refers to an organic solvent that will not co-ordinate with the metal ions, and that is suitable for use in thermal decomposition reactions.

The term "halogen" as used herein refers to fluoro, bromo, chloro and/or iodo.

The term "lower alkoxy" refers to the oxides of lower alkyl groups. Examples of lower alkyl groups include, but are not limited to, methyl, ethyl, propyl, isopropyl, butyl, isobutyl, sec-butyl, tert-butyl, pentyl, n-hexyl, octyl, dodecyl, and the like. The oxides includes methoxide, ethoxide, butoxide, and the like.

The present invention discloses methods, apparatus, and processes for the delivery of aerosolized powders, such as catalysts supported on solids.

II. The Injector

An injector of the invention is illustrated in FIG. 1. In a moving bed or fluidized bed process, the supported catalyst can be fluidized or entrained with the flow of gas, particularly non-reactive gas. The entrained supported catalyst can be heated to a temperature near the reaction temperature and delivered to the reaction chamber along with other reactants. Thus, for example, the supported catalyst can be introduced at the top of a vertical reaction chamber and allowed to move downward through the reactant gas, and the solid material withdrawn from the bottom of the reaction chamber. The solid material containing the product(s), unreacted catalyst, and byproducts can be separated by methods such as by filter, centrifuge or cyclone separator, and the recovered unreacted catalyst can be recycled.

The present method is especially designed for the production of carbon single-walled nanotubes (SWNTs) because the reaction conditions to which the catalytic particles are exposed are highly controlled. The ability to regulate temperature and reactant concentrations is important to obtain the high selectivity necessary to produce SWNTs. Further, the methods and apparatuses of the present invention allow for the continuous synthesis of SWNTs. In the methods and apparatuses described herein, the process of preparing and delivering the catalyst has been separated from the reactor in which the synthesis of SWNTs such that the catalytic particles are not contacted with the reactive gas (e.g., methane or carbon monoxide) until the optimal reaction conditions have been achieved. For example, the yield of nanotubes is affected by the catalyst formulation (e.g., transition metal ratio, type of support, and metal loading), by the operating parameters (e.g., reaction temperature, catalytic gas pressure, and reaction time), and by pretreatment conditions.

The injector of FIG. 1 comprises a first container 10 for the supported catalytic particles 5, heaters 15 for heating the gases and/or the supported catalyst, a conduit structure 20 attached to the container 10 that allows the catalytic particles to be drawn from the container and directed towards the fluidized bed 30 comprising a conveyer 40 having a perforated region 50 through which a gas can be forced upwards thereby entraining the supported catalytic particles into a second chamber 60. The entrained supported catalyst in the second chamber 60 can be heated to an appropriate reaction temperature using the heaters 70, the electrostatic charge, if present, neutralized using the neutralizer 80, and the aerosolized catalyst can be delivered via the nozzle 90 to the reactor at a constant flow rate. Thus, the fluidized injector of the invention has the advantage of providing a homogeneous and constant concentration of the catalyst particles for the synthesis of the SWNTs. The methods and apparatus of the invention provide high yields of SWNTs, thereby allowing for the industrial production of SWNTs.

Initially, a quantity of catalytic particles 5 can be introduced into a container, such as but not limited to, the container 10 illustrated in FIG. 1. The catalytic particles can be any catalysts effective in forming carbon nanotubes. The preparation of the supported catalytic particles are described in detail below, but it will be understood that the present invention is not to be limited to the types of catalytic particle explicitly described herein. Typically, the catalytic particles comprise a solid support material which has been impregnated with a metallic catalyst.

The catalytic particles 5 can be heated using the heaters 10, by using an inert preheating gas introduced under high pressure through gas inlet 12 and therefrom through gas outlet 13, whereby the inert preheating gas heats the catalytic particles, or by any other means known in the art. Once heated, the supported catalytic particles can be reduced using a heated reducing gas, such as $H_2$ and/or He and $H_2$ which is introduced under high pressure through gas inlet 12 into the container 10 and therefrom through gas outlet 13. The temperature of the reducing gas can be in the range of from about 400° C. to about 800° C., preferably about 450° C. to about 550° C., such as for example 500° C. The reducing gas can be $H_2$, $NH_3$, $CH_4$, or mixtures thereof and/or other gases such as He, Ar, Kr, Xe, and $N_2$.

After the catalytic particles 5 have been reduced by the heated reducing gas, they can be moved onto the fluidized bed 30. The fluidized bed can be any commercially available fluidized bed that typically comprises a conveyer 40 that can transport the dry, reduced supported catalyst powder towards the porous plate 50. Through the porous plate 50 high pressure gas, such as Ar, He, Kr, Xe, or $N_2$ and combinations thereof, can be introduced. This high pressure gas passes upwardly through the porous plate 50 to fluidize the powder placed thereupon. The gas flows upwards through the porous plate in the form of many fine jets fluidizing the supported catalyst powder, so that the catalyst particles float or hover in the air flow, thereby providing the fluidized powder. The fluidizing action of the pressurized gas directed through the porous plate allows the powder to be directed towards the attached reactor.

The fluidized powder is pushed upwards into a second container 60. The second container 60 comprises side walls and an opening at or near the top 90 that attaches to the reactor. The side walls of the container can contain one or more heaters 70 and/or one or more neutralizers 80. During operation, particles of about 20 $m^2/g$ to about 150 $m^2/g$ are transported to the gas pervious plate 50. Gas, such as argon gas, is passed though the powder at a rate of about 2 Lpm to about 20 Lpm to aerosolize the particles. The gas flow can be adjusted to deliver from 0.1 $g/m^3$ to about 200 $g/m^3$, such as about 1 $g/m^3$ to about 150 $g/m^3$, or more preferably, about 5 $g/m^3$ to about 100 $g/m^3$, such as about 25 $g/m^3$, about 50 $g/m^3$, about 75 $g/m^3$, about 300 $g/m^3$, and the like of the aerosolized particles to the reactor. The concentration of the aerosolized particles entrained in the gas can be adjusted to meet the requirements of the experiment. The aerosolized catalyst powder in the chamber 60 can be heated using the heater(s) 70 to a temperature of about 600° C. to about 1200° C., preferably to about 750° C. to about 950° C. The electrostatic charge on the aerosolized catalyst powder, if present, can be neutralized using any commercially available neutralizer 80. The heated and/or deionized aerosolized catalyst powder can be delivered to the reactor via the nozzle 90. The flow of the aerosolized catalyst powder that is delivered to the reactor can be controlled by adjusting the flow rate of the gas used to aerosolize the supported catalyst. For example, a concentration of about 1 g/h to about 150 g/h preferably about 5 g/h to 100 g/h, or a concentration about 200 g/h can be delivered as required. Thus, the fluidized injector of the invention has the advantage of providing a homogeneous and constant concentration of the catalyst particles for the continuous synthesis of the SWNTs.

III. The Catalyst

The method, processes, and apparatuses of the present invention use supported metal nanoparticles as the catalyst particles. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. Such materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. The metal nanoparticles on the support powders are injected as an aerosol into the reaction vessel. The function of the metallic catalyst in the carbon nanotube growth process is to decompose the carbon precursors and aid the deposition of ordered carbon as nanotubes The metal catalyst can be selected from a Group V metal, such as V, Nb, or Ta and mixtures thereof, a Group VI metal including Cr, W, Mo, or U and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Hg, Sc, Y, or La and mixtures thereof. Specific examples of mixture of catalysts, such as bimetallic catalysts, which may be employed by the present invention include C—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Preferably, the metal catalyst is iron, cobalt, nickel, molybdenum, or a mixture thereof, such as Fe—Mo, Co—Mo and Ni—Fe—Mo.

The metal, bimetal, or combination of metals are used to prepare metal nanoparticles having defined particle size and diameter distribution. The metal nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.1 nm to about 100 nm, preferably about 1 nm to about 20 nm, more preferably about 2 nm to about 11 nm and most preferably about 3 nm to 7 nm can be prepared. The metal nanoparticles can thus have a particle size of 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy) ethanol, $H(OCH_2CH_2)_2O(CH_2)_3CH_3$, which will be referred to below using the common name dietheylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75\times10^{-5}$ to about $1.73\times10^{-3}$ moles (10-300 mg) of $FeAc_2$ can be dissolved in about $3\times10^{-4}$ to about $3\times10^{-3}$ moles (50-500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, or more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Ore. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered oxide can have a surface area of about 50 to about 1000 $m^2/g$, more preferably a surface area of about 200 to about 800 $m^2/g$. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1-2 82 m particle size and having a surface area of 300 -500 $m^2/g$ is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. For example, extraction includes heating the homogenized mixture to a temperature where the passivating solvent has a significant vapor pressure. This temperature can be maintained until the passivating solvent evaporates, leaving behind the metal nanoparticles deposited in the pores of the $Al_2O_3$. For example, if diethylene glycol mono-n-butyl ether as the passivating solvent, the homogenous dispersion can be heated to 231° C., the boiling point of the passivating solvent, under an $N_2$ flow. The temperature and $N_2$ flow are maintained until the passivating solvent is completely evaporated. After evaporating the passivating solvent, the powdered oxide and metal nanoparticles are left behind on the walls of the reaction vessel as a film or residue. When the powdered oxide is $Al_2O_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

VI. Carbon Precursors

The carbon nanotubes can be synthesized using carbon precursors, such as carbon containing gases. In general, any carbon containing gas that does not pyrrolize at temperatures up to about 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The specific reaction temperature used depends on the type of catalyst and the type of precursor. Energy balance equations for the respective chemical reactions can be used to analytically determine the optimum CVD reaction temperature to grow carbon nanotubes. This determines the required reaction temperature ranges. The optimum reaction temperature also depends on the flow rates of the selected precursor and the catalyst. In general, the method requires CVD reaction temperatures ranging from 500° C. to 1000° C., more preferably reaction temperatures ranging from 700° C. to 900° C.

Synthesis of Carbon Nanotubes

The metal nanoparticles supported on the oxide powder can be aerosolized and introduced into the reactor using the fluidized bed injector described above. Simultaneously, the carbon precursor gas can be introduced into the reactor. The flow of reactants within the reactor can be controlled such that the deposition of the carbon products on the walls of the reactor is reduced. The carbon nanotubes thus produced can be collected and separated.

Thus, the nanotube synthesis generally occurs as described below. The entrained powdered catalyst can be delivered near or at the top of the reaction chamber of a vertical reactor. A flow of methane or another carbon source gas, optionally with hydrogen is also delivered to the reaction chamber. The typical flow rates can be 2700 sccm for argon, 1500 sccm for methane, and 500 sccm for He. Additionally, 2500 sccm of argon can be directed into the helical flow inlets to reduce deposition of carbon products on the wall of the reaction chamber. The reaction chamber can be heated to between about 800° C. and 900° C. during reaction using heaters. The temperature can be 810° C., 820° C., 830° C., 840° C., 850° C., 860° C., 870° C., 880° C., and the like, or any temperature in between. The temperature is preferably kept below the decomposition temperature of the carbon precursor gas. For example, at temperatures above 1000° C., methane is known to break down directly into soot rather than forming carbon nanostructures with the metal growth catalyst.

Carbon nanotubes and other carbon nanostructures synthesized in reaction chamber then enter the filtration system. The filtration system can be composed of a single collection vessel or a series of collection vessels that are connected to outlet of the reaction chamber. The collection vessels sort the carbon nanotubes and other outputs by weight. On average, the heaviest reaction products will settle in the first collection vessel. The secondary and tertiary vessels will collect on average lighter products. The carbon nanotubes will be relatively light compared to many of the soot particles generated, so the carbon nanotubes will preferentially collect in the secondary and tertiary collection vessels.

The disclosed methods and apparatus permit continuous operation of the reaction chamber, as the chamber does not have to be cooled to harvest the synthesized nanotubes. Instead, the nanotubes can be harvested by changing the collection vessel. As the reaction products flow down from the reaction chamber, the collection vessels will capture the various reaction products, with lighter reaction products tending to accumulate in the secondary or tertiary collection vessel. The collection vessels can be changed to permit the harvesting of the reaction products while still synthesizing additional carbon nanostructures.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Catalysts were prepared by impregnating support materials in metal salt solutions. For the single metallic iron based catalyst, $FeAc_2$ in methanol was used at a molar ratio of $Fe:Al_2O_3$ of 1:15. Under a nitrogen atmosphere, $FeAc_2$ was added to dietheylene glycol mono-n-butyl ether in the molar ratio of 1mM:20mM. The reaction mixture was mixed under the nitrogen atmosphere using a magnetic stir bar, and heated under reflux for 90 minutes. The reaction mixture was then cooled to room temperature, and $Al_2O_3$ (15 mM) was added at once. The reaction solution was stirred at room temperature for 15 minutes, and then heated to 150° C. for 3 hours. The reaction was cooled to 90° C. while flowing a stream of $N_2$ over the mixture to remove the solvent. A black film formed on the walls of the reaction flask. The black film was collected and ground with an agate mortar to obtain a fine black powder.

Example 2

Synthesis of Carbon Nanotubes

About 10 g of the $Al_2O_3$-supported iron catalyst prepared in Example 1 was placed in the chamber and heated to 500° C. The heated supported catalyst was reduced by passing $H_2$/He (1:1 v/v) into the chamber. The dry, reduced supported catalyst powder thus obtained is dropped onto the conveyer belt that transports it onto the porous plate in the fluidized bed injector. The catalyst was aerosolized by passing argon through the bottom of the container and through the channels at a flow rate of 15 Lpm. The argon flow with the entrained catalyst particles is heated to about 700° C., the electrostatic charge neutralized, and delivered to the reactor. Thus, the supported catalyst, at a mass concentration of about 150 g/$m^3$ entrained in argon and preheated before being passed into the reaction chamber for producing carbon nanotubes.

The synthesis of the SWNTs was carried out in a vertical reactor. The preheated entrained catalyst is delivered near the top of the vertical reactor. The reaction chamber was preheated to 820° C. Argon, at a rate of 2500 sccm, was injected through the helical flow inlets into the reaction chamber. The synthesis was begun by flowing a mixture at $CH_4$ at a flow rate of 1500 sccm into the reaction chamber. The temperature and gas flows were maintained for 120 minutes in order to form carbon nanostructures. The single-walled carbon nanotubes were collected using the product separators. An accumulation of large quantities of dark black, silver-black and very light grey products were observed in container 1, container 2, and the trap respectively. The final product was separated from the $Al_2O_3$-support powder by treatment with hydro fluoric acid (HF). Carbon nanotubes were made with high purity of up to 95 wt %. High resolution transmission electron microscopy images (TEM) and Raman spectroscopy show that SWNTs with an average bundle diameter of approximate 7 nm.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for producing carbon single-walled carbon nanotubes (SWNTs), the method comprising:

providing dry and reduced catalytic particles, wherein the catalytic particles comprise a support-material and a catalytic material;

introducing the dry and reduced catalytic particles into a fluidized bed;

creating an aerosol of dry and reduced catalytic particles using the fluidized bed;

injecting the aerosol of dry and reduced catalytic particles into a reactor; and catalytically forming SWNTs by exposing the reduced catalytic particles to a carbon-containing gas for a duration of time and at a temperature sufficient to cause catalytic production of SWNTs.

2. The method of claim 1, wherein the catalytic particles comprises cobalt, iron, nickel, tungsten, molybdenum or combinations thereof.

3. The method of claim 1, wherein the aerosol comprises an inert gas selected from the group consisting of He, Ar, and $N_2$.

4. The method of claim 1, wherein the carbon-containing gas comprises a gas selected from the group consisting of CO, $CH_4$, $C_2H_4$, and $C_2H_2$, or mixtures thereof.

5. The method of claim 1, wherein the support material is selected from the group consisting of $SiO_2$, $Al_2O_3$, MgO, $ZrO_2$, zeolites, MCM-41, and Mg(Al)O.

6. The method of claim 1, wherein the reaction temperature is about 700° C. to about 1000° C.

7. The method of claim 6, wherein the reaction temperature is about 750° C. to about 950° C.

8. The method of claim 1, wherein the carbon-containing gas further comprises a diluent gas.

9. The method of claim 1, wherein the dry and reduced catalytic particles are heated prior to injecting the dry and reduced catalytic particles into the reactor.

* * * * *